United States Patent
Hiroi et al.

(10) Patent No.: US 11,554,664 B2
(45) Date of Patent: Jan. 17, 2023

(54) DRIVE FORCE DISTRIBUTION METHOD AND DRIVE FORCE DISTRIBUTION CONTROL DEVICE FOR FRONT AND REAR WHEEL DRIVE VEHICLE

(71) Applicant: Nissan Motor Co., Ltd., Yokohama (JP)

(72) Inventors: Daisuke Hiroi, Kanagawa (JP); Hiroshi Nishida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/617,985

(22) PCT Filed: Jul. 4, 2019

(86) PCT No.: PCT/JP2019/026626
§ 371 (c)(1),
(2) Date: Dec. 10, 2021

(87) PCT Pub. No.: WO2021/001988
PCT Pub. Date: Jan. 7, 2021

(65) Prior Publication Data
US 2022/0258603 A1    Aug. 18, 2022

(51) Int. Cl.
*B60K 23/08*    (2006.01)
*B60K 17/348*    (2006.01)

(52) U.S. Cl.
CPC ........ *B60K 17/348* (2013.01); *B60K 23/0808* (2013.01); *B60K 2023/085* (2013.01)

(58) Field of Classification Search
CPC .............. B60K 17/348; B60K 23/0808; B60K 2023/085; B60K 2023/0833; B60K 5/04;
(Continued)

(56) References Cited

U.S. PATENT DOCUMENTS

| 10,744,875 B2 * | 8/2020 | Komatsubara ......... B60K 23/04 |
| 2003/0098193 A1 * | 5/2003 | Ohtsu ................. B60K 23/0808 |
| | | 180/197 |

(Continued)

FOREIGN PATENT DOCUMENTS

| DE | 102017212650 A1 * | 1/2019 | .......... B60K 17/344 |
| JP | 2003-159952 A | 6/2003 | |

(Continued)

*Primary Examiner* — Justin Holmes
(74) *Attorney, Agent, or Firm* — Global IP Counselors, LLP

(57) ABSTRACT

A drive force distribution method and a drive force distribution control device is provided for a front and rear wheel drive vehicle provided with a drive force distribution device that controls a distribution of a drive force generated by a drive force source to main drive wheels and auxiliary drive wheels. A present distribution of the drive force to an auxiliary drive wheel side is increased by a first predetermined amount upon determining the rotational speed difference between the rotational speeds of the main drive wheels and the auxiliary drive wheels has been determined to not be smaller than a predetermined rotational speed difference. The present distribution of the drive force to the auxiliary drive wheel side is reduced by a second predetermined amount when the rotational speed difference has been determined to be smaller than the predetermined rotational speed difference.

13 Claims, 6 Drawing Sheets

(58) Field of Classification Search
CPC ... B60K 17/344; B60K 17/35; B60K 17/3505
See application file for complete search history.

(56) References Cited

U.S. PATENT DOCUMENTS

| | | |
|---|---|---|
| 2009/0037053 A1 | 2/2009 | Yamazaki |
| 2009/0043469 A1 | 2/2009 | Fukuda et al. |
| 2016/0039403 A1 * | 2/2016 | Kato .................. B60W 40/12 701/60 |

FOREIGN PATENT DOCUMENTS

| | | |
|---|---|---|
| JP | 2010-23734 A | 2/2010 |
| JP | 6512273 B1 * | 5/2019 |

* cited by examiner

DRIVE FORCE DISTRIBUTION METHOD AND DRIVE FORCE DISTRIBUTION CONTROL DEVICE FOR FRONT AND REAR WHEEL DRIVE VEHICLE

CROSS-REFERENCE TO RELATED APPLICATIONS

This application is a U.S. national stage application of International Application No. PCT/JP2019/026626, filed on Jul. 4, 2019.

BACKGROUND

Technical Field

The present invention relates to a method and device for distributing drive force in a front and rear wheel drive vehicle

Background Information

Japanese Laid-Open Patent Application No. 2010-23734 (Patent Document 1) discloses a front and rear wheel drive vehicle in which drive force for front wheels, which are main drive wheels, is distributed via an electronically controlled coupling to rear wheels, which are auxiliary drive wheels, wherein the drive force distributed to the rear wheels, which are auxiliary drive wheels, is increased in the event of understeer by the vehicle during turning.

SUMMARY

However, in the technology taught in Patent Document 1, when the difference in rotational speed between the front wheels, which are main drive wheels, and the rear wheels, which are auxiliary drive wheels, is small and the drive force distributed to the rear wheels, which are auxiliary drive wheels, is increased, excessive differential limiting force may generate a reverse moment in the turning direction, which may further understeer of the vehicle.

The present invention was contrived in view of the problems described above, the present invention providing a method and device for distributing drive force in a front and rear wheel drive vehicle in which any furtherance of vehicle understeer is minimized.

With the method and device for distributing drive force in a front and rear wheel drive vehicle of the present invention, when the rotational speed difference between the rotational speed of the main drive wheels and the rotational speed of the auxiliary drive wheels has been determined to be smaller than a predetermined rotational speed difference, a present distribution of drive force to the auxiliary drive wheel side in the drive force distribution device is reduced by a second predetermined amount.

Consequently, in the present invention, any furtherance of vehicle understeer is minimized.

BRIEF DESCRIPTION OF THE DRAWINGS

Referring now to the attached drawings which form a part of this original disclosure.

PREFERRED EMBODIMENTS OF THE INVENTION

Embodiments of the present invention will be described below with reference to the drawings.

First Embodiment

Figure 1:
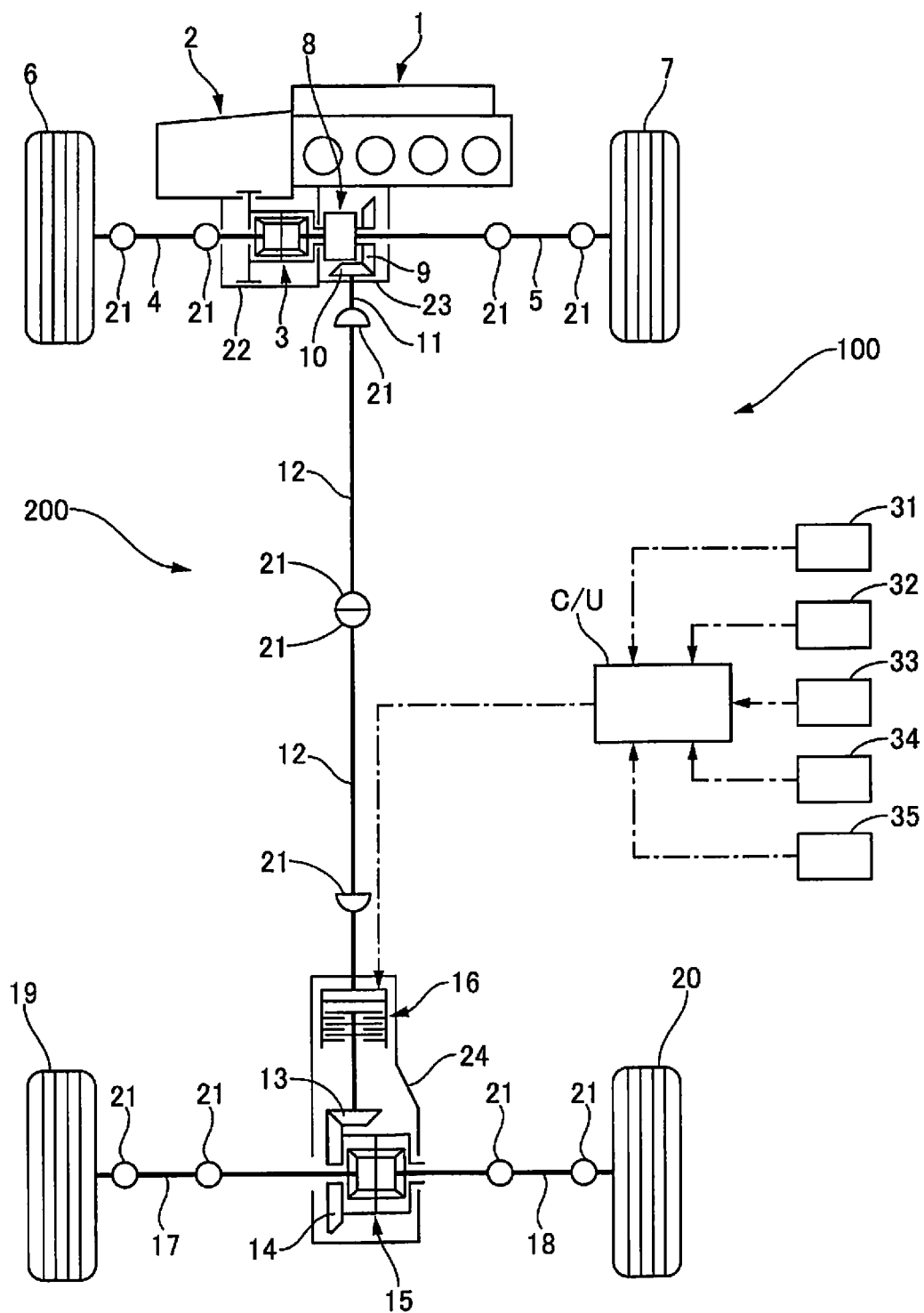
FIG. 1 is a structural diagram of a drive force distribution device for a front and rear wheel drive vehicle to which the present invention is applied.

FIG. 1 is a structural diagram of a device for distributing drive force in a front and rear wheel drive vehicle to which the present invention is applied.

A configuration of a drive force transmission device 200 shall be described based on FIG. 1.

A front-wheel drive system of the drive force transmission device 200 of a front and rear wheel drive vehicle 100 comprises a transversely mounted engine 1 (drive force source), an automatic transmission 2, a front differential 3, a left front wheel drive shaft 4, a right front wheel drive shaft 5, a left front wheel 6 (main drive wheel), and a right front wheel 7 (main drive wheel), as shown in FIG. 1. Specifically, drive force generated by the transversely mounted engine 1 is transmitted to the left and right front wheel drive shafts 4, 5 via the automatic transmission 2 and the front differential 3, and the left and right front wheels 6, 7 are constantly driven while a differential is allowed. An electric motor may be used as the drive force source.

A rear-wheel drive system of the drive force transmission device 200 of the front and rear wheel drive vehicle comprises a dog clutch 8, a bevel gear 9, an output pinion 10, a rear wheel output shaft 11, and a propeller shaft 12, as shown in FIG. 1. This system also comprises an electronically controlled coupling 16 (drive force distribution device), a drive pinion 13, a ring gear 14, a rear differential 15, a left rear wheel drive shaft 17, a right rear wheel drive shaft 18, a left rear wheel 19 (auxiliary drive wheel), and a right rear wheel 20 (auxiliary drive wheel). Specifically, this constitutes a drive system with which it is possible to select two-wheel drive mode in which the dog clutch 8 and the electronically controlled coupling 16 are both disengaged. Due to the dog clutch 8 and the electronically controlled coupling 16 being disengaged, rotation in the drive system downstream of the dog clutch 8 (rotation of the propeller shaft 12, etc.) stops, whereby friction loss, oil stirring loss, etc., are minimized and fuel efficiency is improved. Numerals 21 in FIG. 1 indicate universal joints.

The dog clutch 8 is provided in a position where driving branches from the left and right front wheels 6, 7 to the left and right rear wheels 19, 20, and is a meshing clutch that by clutch disengagement cuts the system of drive force transmission to the left and right rear wheels 19, 20 off from the system of drive force transmission to the left and right front wheels 6, 7. An input-side meshing member of the dog clutch 8 is linked to a differential case of the front differential 3, and an output-side meshing member of the dog clutch 8 is linked to a bevel gear 9. The dog clutch 8, the bevel gear 9, the output pinion 10, and part of the rear wheel output shaft 11 are built into a transfer case 23 fixed in a position adjacent to a front differential housing 22. In the dog clutch 8, for example, one of a pair of meshing members (not shown) is a fixed member, the other is a movable member, a spring that urges in an engaging direction is provided between the fixed member and the movable member, and a threaded groove capable of fitting with a solenoid pin is formed in an outer periphery of the movable member. When the dog clutch 8 is disengaged, the solenoid pin is caused to protrude into and fit in the threaded groove, whereupon the movable member makes a stroke in the disengaging direction while rotating, and the meshing is disengaged when the stroke amount exceeds a predetermined amount. When the dog clutch 8 is engaged, the solenoid pin is unfitted from the threaded groove, whereupon the movable member makes a stroke in the engaging direction toward the fixed member due to the spring urging force, and toothed parts of the two members mesh together and engage.

The electronically controlled coupling 16 is a drive force distribution device that is provided in a position downstream of the drive branching position where the dog clutch 8 is provided, and that distributes some of the drive force from the transversely mounted engine 1 to the left and right rear wheels 19, 20 in accordance with the engagement capacity of the clutch. An input-side clutch plate of the electronically controlled coupling 16 is linked to the propeller shaft 12, and an output-side clutch plate is linked to the drive pinion 13. The electronically controlled coupling 16 is built into a rear differential housing 24. The electronically controlled coupling 16 has, for example (not shown), a multi-plate friction clutch with multiple input-side and output-side plates arranged in alternating fashion, a fixed cam piston and movable cam piston having opposing cam surfaces, and a cam member interposed between the opposing cam surfaces. When the electronically controlled coupling 16 is engaged, the movable cam piston is caused to rotate by the electric motor, whereupon the movable cam piston makes a stroke in the clutch engagement direction in accordance with the rotation angle due to cam action enlarging a gap between the pistons, and frictional engagement force of the multi-plate friction clutch is increased. When the electronically controlled coupling 16 is disengaged, the movable cam piston is caused by the electric motor to rotate in the direction opposite the engagement direction, whereupon the movable cam piston makes a stroke in the clutch disengagement direction in accordance with the rotation angle due to cam action reducing the gap between the pistons, and the frictional engagement force of the multi-plate friction clutch is reduced.

A control unit C/U (drive force distribution control device) that controls engagement force of the electronically controlled coupling 16 is a "microcomputer" that is configured including a CPU, ROM, RAM, an input/output interface, etc., and that processes signals in accordance with programs stored in advance in the ROM while utilizing a temporary storage function of the RAM.

For example, the control unit C/U carries out tasks such as controlling drive force that can be transmitted by the electronically controlled coupling 16 through control of a command value for electric current supplied to the electric motor provided to the electronically controlled coupling 16; i.e., the control unit C/U executes drive force distribution control pertaining to front and rear wheel drive through the drive force transmission device 200. Therefore, in order to carry out drive force distribution control, the drive force transmission device 200 is provided with a vehicle wheel speed sensor 31 that detects actual rotational speeds of the left and right front wheels 6, 7 and the left and right rear wheels 19, 20, a steering angle sensor 32 that detects a steering angle of a steering wheel (not shown), an accelerator position sensor 33 that detects an accelerator position corresponding to a pressed amount of an accelerator pedal (not shown), a yaw rate sensor 34 that detects an actual lateral direction G (acceleration rate) of the front and rear wheel drive vehicle 100, a longitudinal G sensor 35 that detects an actual longitudinal direction G (acceleration rate) of the front and rear wheel drive vehicle 100, and other various sensors. Signals representing the rotational speeds of the vehicle wheels, i.e., the left and right front wheels 6, 7 and the left and right rear wheels 19, 20, a signal representing the steering angle of the steering wheel, a signal representing the accelerator position, a signal representing the lateral G of the vehicle, a signal representing the longitudinal G of the vehicle, etc., are supplied from the respective sensors to the control unit C/U.

Figure 2:
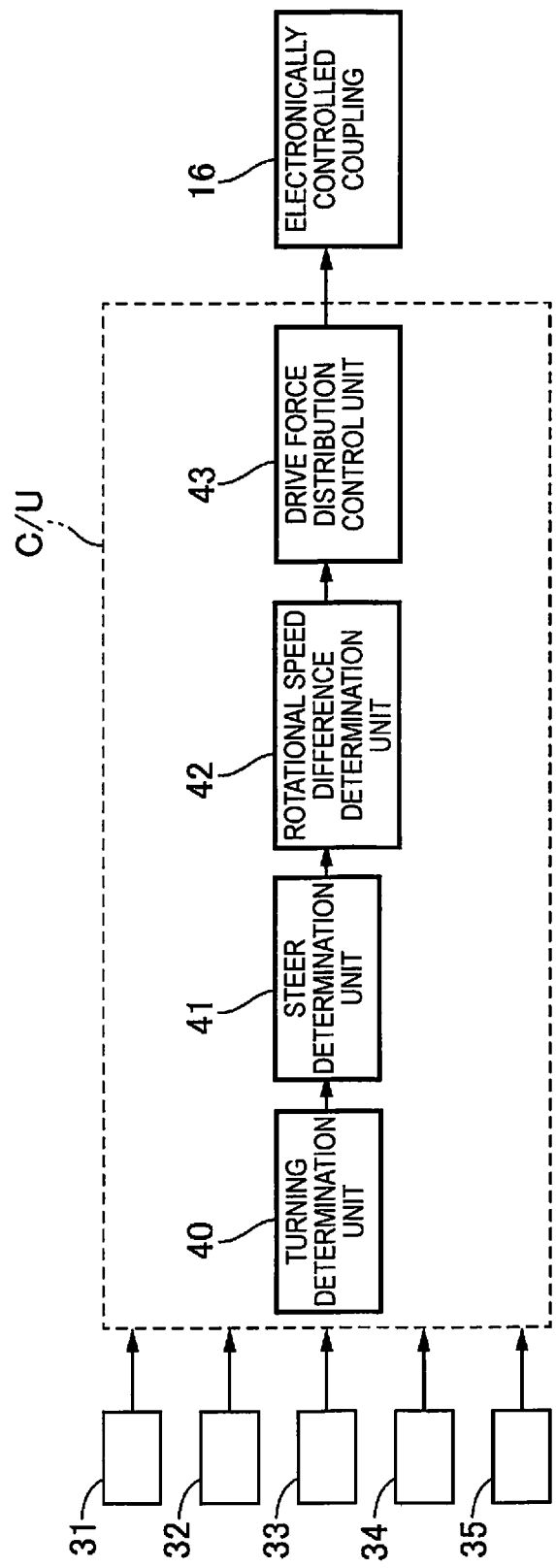
FIG. 2 is a block diagram of control in a control unit C/U of the first embodiment.

FIG. 2 is a block diagram of control in the control unit C/U of the first embodiment. The control unit C/U is provided with a turning determination unit 40, a steer determination unit 41, a rotational speed difference determination unit 42, and a drive force distribution control part 43.

The turning determination unit 40 determines a turning travel of the front and rear wheel drive vehicle 100. For example, whether or not the front and rear wheel drive vehicle 100 is performing a turning travel is determined from a pre-established relationship, based on the rotational speeds of the vehicle wheels, i.e., the left and right front wheels 6, 7 and the left and right rear wheels 19, 20 detected by the vehicle wheel speed sensor 31, the steering angle of the steering wheel detected by the steering angle sensor 32, the lateral direction G of the front and rear wheel drive vehicle 100 detected by the yaw rate sensor 34, etc. More simply, the turning travel of the front and rear wheel drive vehicle 100 may be determined in the event that the steering angle of the steering wheel detected by the steering angle sensor 32 and an angle of a power steering output signal, etc., corresponding to the steering angle with respect to the straight-ahead direction are equal to or greater than a predetermined value. The turning travel of the front and rear wheel drive vehicle 100 may also be determined in the event that the lateral direction G of the front and rear wheel drive vehicle 100 detected by the yaw rate sensor 34 is equal to or greater than a predetermined value.

When the turning travel of the front and rear wheel drive vehicle 100 is determined by the turning determination unit 40, the steer determination unit 41 determines neutral steer, oversteer, or understeer of the front and rear wheel drive vehicle 100. For example, from a pre-established relationship, a target yaw rate of the front and rear wheel drive vehicle 100 is calculated based on the steering angle of the steering wheel detected by the steering angle sensor 32, the lateral direction G of the front and rear wheel drive vehicle 100 detected by the yaw rate sensor 34, a vehicle speed V calculated form the rotational speeds of the vehicle wheels detected by the vehicle wheel speed sensor 31, etc. A deviation between a target yaw rate and the actual yaw rate detected by the yaw rate sensor 34 is calculated, and neutral steer, oversteer, or understeer of the front and rear wheel drive vehicle 100 is determined in accordance with this deviation. The front and rear wheel drive vehicle 100 is determined to be in neutral steer when the deviation between the target yaw rate of the front and rear wheel drive vehicle 100 calculated as described above and the actual yaw rate detected by the yaw rate sensor 34 is zero or within a margin of error.

When understeer is determined by the steer determination unit 41, the rotational speed difference determination unit 42 calculates an actual rotational speed difference ΔN between the average rotational speed of the left and right front wheels 6, 7 and the average rotational speed of the left and right rear wheels 19, 20 and compares this difference ΔN with a predetermined rotational speed difference ΔNo to determine whether or not the actual rotational speed difference ΔN is smaller than the predetermined rotational speed difference ΔNo.

When the dog clutch 8 is in an engaged state, the drive force distribution control part 43 sends a command signal to the electric motor of the electronically controlled coupling 16 and executes drive force distribution control pertaining to front and rear wheel drive based on the determination results of the turning determination unit 40, the steer determination unit 41, and the rotational speed difference determination unit 42. Specifically, drive force distribution for straight travel is executed when the front and rear wheel drive vehicle 100 is traveling straight. The present drive force distribution is continued if the front and rear wheel drive vehicle 100 is in neutral steer while turning. If the front and rear wheel drive vehicle 100 is in oversteer while turning, the distribution of drive force to the left and right rear wheels 19, 20 is reduced by a predetermined amount ΔT corresponding to the target yaw rate and the actual yaw rate detected by the yaw rate sensor 34. Furthermore, when the front and rear wheel drive vehicle 100 is in understeer while turning and the actual rotational speed difference ΔN between the average rotational speed of the left and right front wheels 6, 7 and the average rotational speed of the left and right rear wheels 19, 20 is not smaller than the predetermined rotational speed difference ΔNo, the distribution of drive force to the left and right rear wheels 19, 20 is increased by a first predetermined amount ΔT1 corresponding to the deviation between the target yaw rate and the actual yaw rate detected by the yaw rate sensor 34. Conversely, when the actual rotational speed difference ΔN between the average rotational speed of the left and right front wheels 6, 7 and the average rotational speed of the left and right rear wheels 19, 20 is smaller than the predetermined rotational speed difference ΔNo, the first predetermined amount ΔT1 of increase, which corresponds to the deviation between the target yaw rate and the actual yaw rate detected by the yaw rate sensor 34, is minimized, and the distribution of drive force to the left and right rear wheels 19, 20 is reduced by a second predetermined amount ΔT2, which corresponds to the deviation between the actual rotational speed difference ΔN and the predetermined rotational speed difference ΔNo. For example, as the deviation between the actual rotational speed difference ΔN and the predetermined rotational speed difference ΔNo increases when the actual rotational speed difference ΔN is smaller than the predetermined rotational speed difference ΔNo, the second predetermined amount ΔT2 is increased or reduced by a commensurately greater degree.

Figure 3:
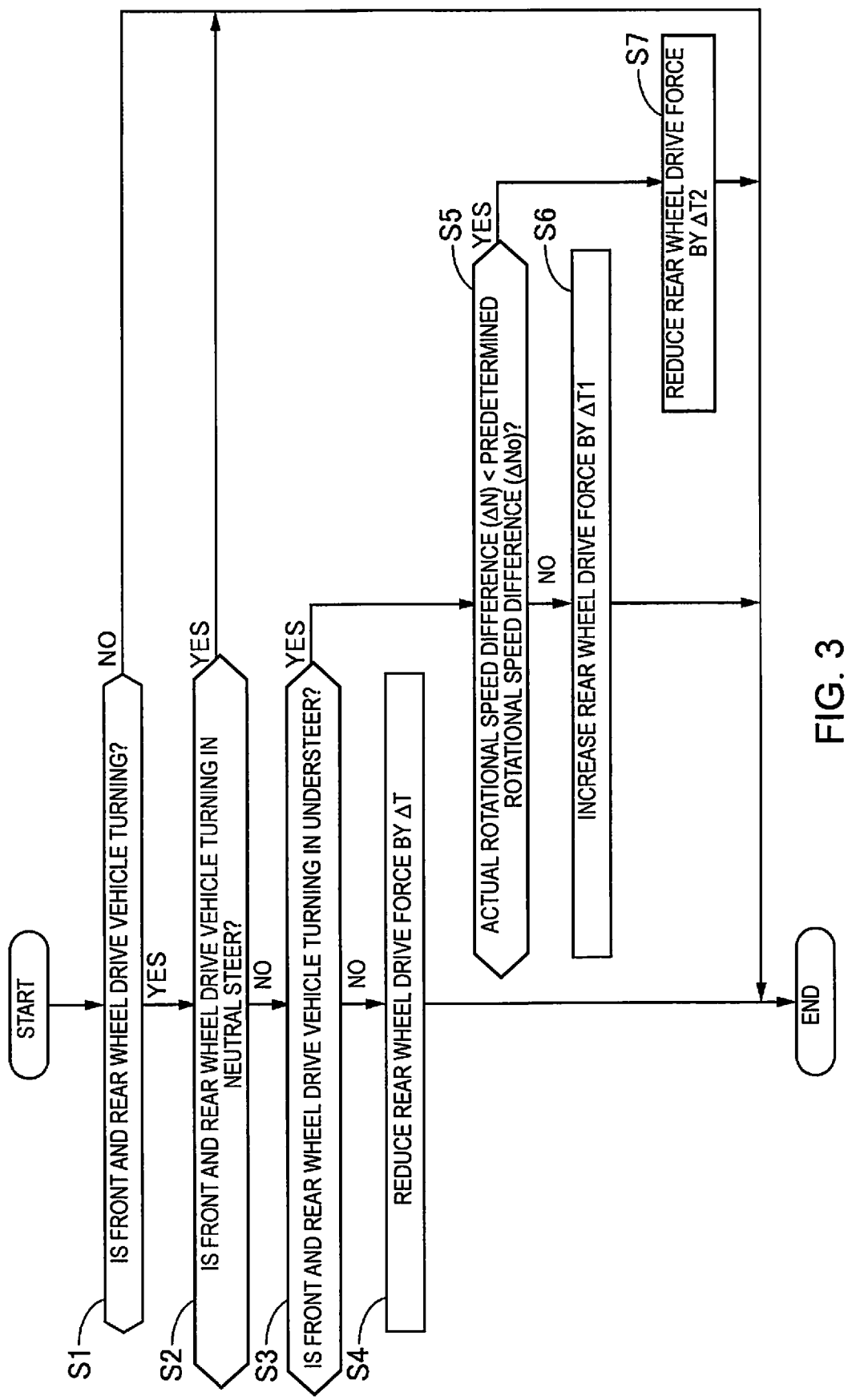
FIG. 3 is a flowchart of a flow of a control process in the control unit C/U of the first embodiment.

FIG. 3 is a flowchart of a flow of a control process in the control unit C/U of the first embodiment. This flowchart is repeatedly executed in a predetermined computation cycle.

In step S1, whether or not the front and rear wheel drive vehicle 100 is turning is determined. If the vehicle is turning, the process advances to step S2, and if the vehicle is not turning, i.e., traveling straight, this control is ended and drive force distribution control for straight travel is executed. In drive force distribution control for straight travel, specifically, drive force distribution of the left and right front wheels and the left and right rear wheels is 50:50 when the vehicle is setting off, and as the vehicle speed V increases, the drive force distribution of the left and right front wheels is increased commensurately further. In step S2, whether or not the front and rear wheel drive vehicle 100 is turning in neutral steer is determined. When the vehicle is not turning in neutral steer, the process advances to step S3, and when the vehicle is turning in neutral steer, the control is ended and the present drive force distribution control continues to be executed.

In step S3, whether or not the front and rear wheel drive vehicle 100 is turning in understeer is determined. When the vehicle is not turning in understeer, i.e., when the vehicle is turning in oversteer, the process advances to step S4, and when the vehicle is turning in understeer, the process advances to step S5. In step S4, because the front and rear wheel drive vehicle 100 is turning in oversteer, the distribution of drive force to the left and right rear wheels 19, 20 is reduced by a predetermined amount ΔT corresponding to the deviation between the target yaw rate and the actual yaw rate detected by the yaw rate sensor 34.

In step S5, a determination is made as to whether or not the actual rotational speed difference ΔN between the average rotational speed of the left and right front wheels 6, 7 and the average rotational speed of the left and right rear wheels 19, 20 is smaller than the predetermined rotational speed difference ΔNo. When the actual rotational speed difference ΔN between the average rotational speed of the left and right front wheels 6, 7 and the average rotational speed of the left and right rear wheels 19, 20 is not smaller than the predetermined rotational speed difference ΔNo, the process advances to step S6, and when the actual rotational speed difference ΔN between the average rotational speed of the left and right front wheels 6, 7 and the average rotational speed of the left and right rear wheels 19, 20 is smaller than the predetermined rotational speed difference ΔNo, the process advances to step S7. The predetermined rotational speed difference ΔNo provides hysteresis between cases in step 7 (described hereinafter) in which the distribution of drive force to the left and right rear wheels 19, 20 has been reduced and cases in which the distribution of drive force to the left and right rear wheels 19, 20 has not been reduced, and prevents hunting.

In step S6, the distribution of drive force to the left and right rear wheels 19, 20 is increased in relation to the drive force distribution for straight travel, which is the present drive force distribution, by the first predetermined amount ΔT1 corresponding to the deviation between the target yaw rate and the actual yaw rate detected by the yaw rate sensor 34. In step S7, the distribution of drive force to the left and right rear wheels 19, 20 is reduced in relation to the drive force distribution for straight travel, which is the present drive force distribution, by the second predetermined amount ΔT2 corresponding to the deviation between the actual rotational speed difference ΔN and the predetermined rotational speed difference ΔNo. For example, with a greater deviation between the actual rotational speed difference ΔN and the predetermined rotational speed difference ΔNo when the actual rotational speed difference ΔN is smaller than the predetermined rotational speed difference ΔNo, the drive force distribution to the left and right rear wheels 19, 20 is reduced by a commensurately greater second predetermined amount ΔT2. Due to this configuration, when the front and rear wheel drive vehicle 100 is in understeer while turning and the actual rotational speed difference ΔN between the average rotational speed of the left and right front wheels 6, 7 and the average rotational speed of the left and right rear wheels 19, 20 is smaller than the predetermined rotational speed difference ΔNo, the distribution of drive force to the left and right rear wheels 19, 20 is reduced by a second predetermined amount ΔT2 corresponding to the deviation between the actual rotational speed difference ΔN and the predetermined rotational speed difference ΔNo, and any furtherance of understeer of the front and rear wheel drive vehicle 100 can therefore be minimized.

Figure 4:
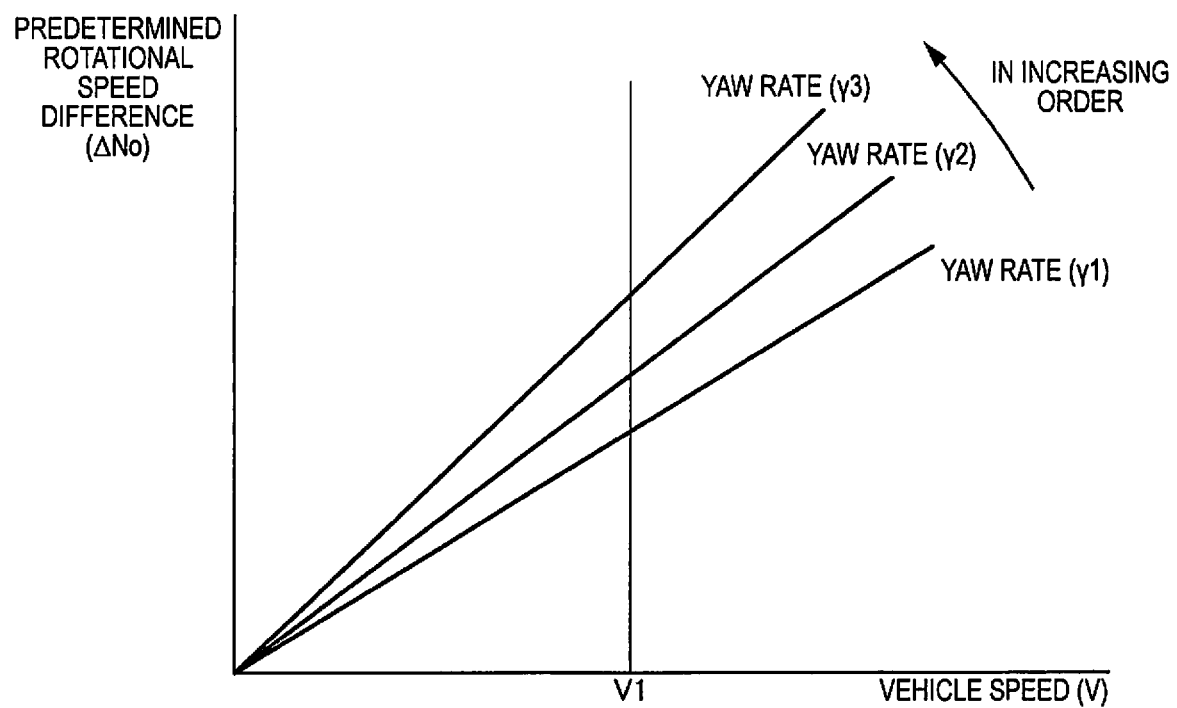
FIG. 4 is a characteristic graph of a predetermined rotational speed difference $\Delta No$ of the first embodiment.

FIG. 4 is a characteristic graph of the predetermined rotational speed difference ΔNo of the first embodiment.

The horizontal axis represents the vehicle speed V, and the vertical axis represents the predetermined rotational speed difference ΔNo. The characteristics of three types of predetermined rotational speed differences ΔNo are shown in correspondence with a magnitude of a yaw rate γ ($γ1<γ2<γ3$).

Fixing the yaw rate γ and looking at the characteristics of yaw rate γ1, the predetermined rotational speed difference ΔNo is set commensurately larger as the vehicle speed V increases. Fixing the vehicle speed V and looking at the characteristics of vehicle speed V1, the predetermined rotational speed difference ΔNo is set commensurately larger as the yaw rate γ ($γ1<γ2<γ3$) increases. Specifically, the predetermined rotational speed difference ΔNo may be set commensurately larger as either the vehicle speed V or the yaw rate γ increases, or may be set commensurately larger as both the vehicle speed V and the yaw rate γ increase. It is thereby possible to further minimize any furtherance of understeer of the front and rear wheel drive vehicle 100, because the predetermined rotational speed difference ΔNo is set in correspondence with the turning characteristics of the front and rear wheel drive vehicle 100. As described above, the predetermined rotational speed difference ΔNo provides hysteresis and prevents hunting. In addition, the steering angle of the steering wheel detected by the steering angle sensor 32 may be used instead of the yaw rate γ.

As described above, the first embodiment has the effects enumerated below. (1) When the front and rear wheel drive vehicle 100 is in understeer while turning and the actual rotational speed difference ΔN between the average rotational speed of the left and right front wheels 6, 7 and the average rotational speed of the left and right rear wheels 19, 20 is smaller than the predetermined rotational speed difference ΔNo, the distribution of drive force to the left and right rear wheels 19, 20 is reduced by a second predetermined amount ΔT2 corresponding to the deviation between the actual rotational speed difference ΔN and the predetermined rotational speed difference ΔNo. Therefore, any furtherance of understeer of the front and rear wheel drive vehicle 100 can be minimized.

(2) The predetermined rotational speed difference ΔNo is set commensurately larger as the vehicle speed V and/or the yaw rate γ increases. Therefore, any furtherance of understeer of the front and rear wheel drive vehicle 100 can be further minimized, because the predetermined rotational speed difference ΔNo is set in correspondence with the turning characteristics of the front and rear wheel drive vehicle 100.

Second Embodiment

Figure 5:
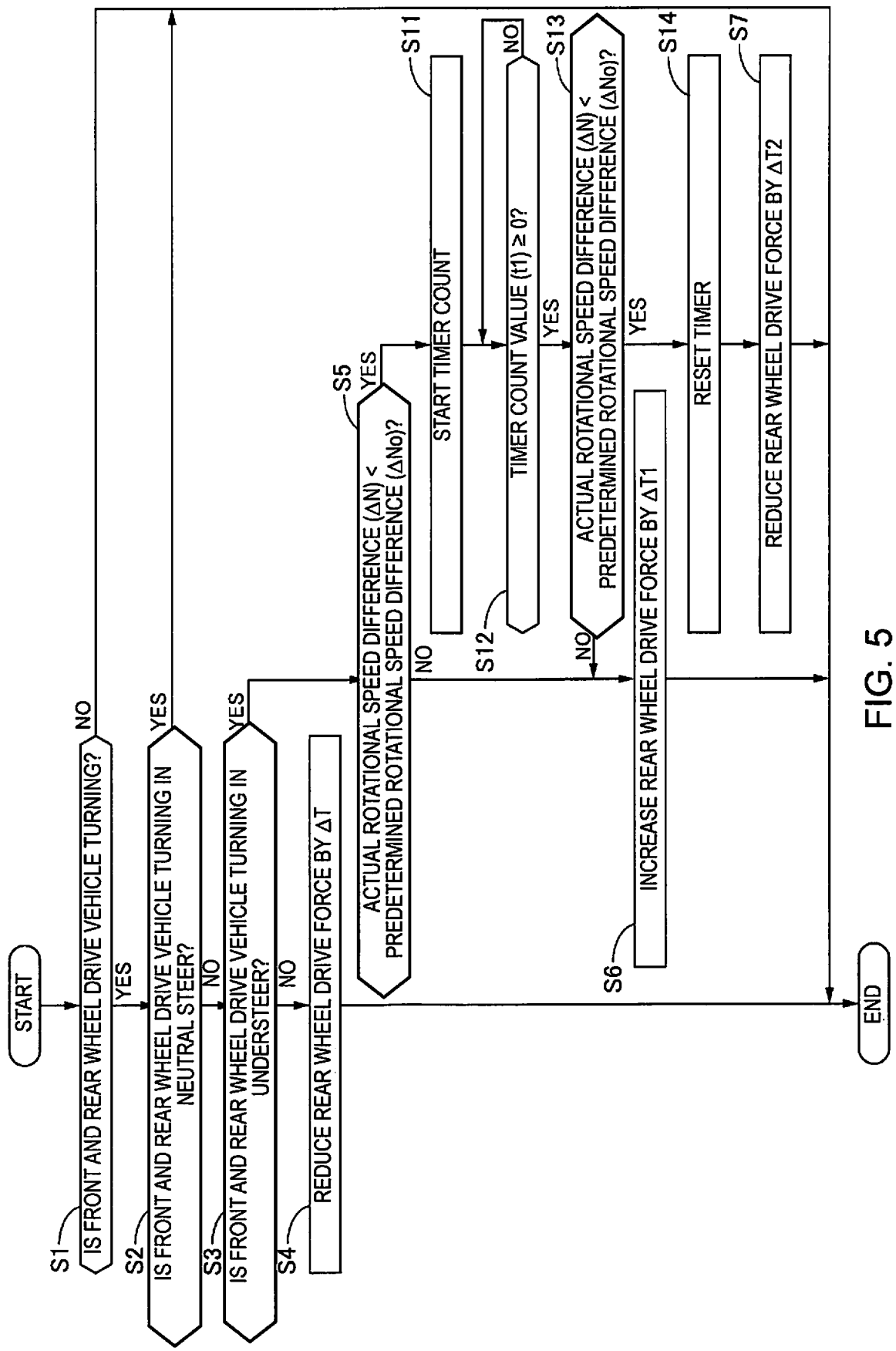
FIG. 5 is a flowchart of a flow of a control process in a control unit C/U of a second embodiment.

FIG. 5 is a flowchart of a flow of a control process in a control unit C/U of the second embodiment. This flowchart is repeatedly executed in a predetermined computation cycle.

The basic configuration of the second embodiment is the same as that of the first embodiment, and therefore only sections different from the first embodiment are described. Specifically, steps S11 to S14 are added between steps S5 and S7.

In step S11, a timer count is started after the actual rotational speed difference ΔN between the average rotational speed of the left and right front wheels 6, 7 and the average rotational speed of the left and right rear wheels 19, 20 has been determined to be smaller than the predetermined rotational speed difference ΔNo. In step S12, whether or not a timer count value t1 is equal to or greater than a predetermined time t0 is determined. When the timer count value t1 is equal to or greater than the predetermined time t0, the process advances to step S13, and when the timer count value t1 is not equal to or greater than the predetermined time t0, the process returns to step S12. In step S13, a determination is again made as to whether or not the actual rotational speed difference ΔN between the average rotational speed of the left and right front wheels 6, 7 and the average rotational speed of the left and right rear wheels 19, 20 is smaller than the predetermined rotational speed difference ΔNo. When the actual rotational speed difference ΔN between the average rotational speed of the left and right front wheels 6, 7 and the average rotational speed of the left and right rear wheels 19, 20 is not smaller than the predetermined rotational speed difference ΔN, the process advances to step S6, and when the actual rotational speed difference ΔN between the average rotational speed of the left and right front wheels 6, 7 and the average rotational speed of the left and right rear wheels 19, 20 is smaller than the predetermined rotational speed difference ΔN, the process advances to step S14. In step S14, the timer is reset and the process advances to step S7. Specifically, when the actual rotational speed difference ΔN between the average rotational speed of the left and right front wheels 6, 7 and the average rotational speed of the left and right rear wheels 19, 20 has been determined to be smaller than the predetermined rotational speed difference ΔNo, the distribution of drive force to the left and right rear wheels 19, 20 is not immediately reduced by a second predetermined amount ΔT2 corresponding to the deviation between the actual rotational speed difference ΔN and the predetermined rotational speed difference ΔNo, but the present drive force distribution is maintained for the predetermined time to, and after the predetermined time t0 has elapsed, the determination is again made as to whether or not the actual rotational speed difference ΔN between the average rotational speed of the left and right front wheels 6, 7 and the average rotational speed of the left and right rear wheels 19, 20 is smaller than the predetermined rotational speed difference ΔNo. It is thereby possible to minimize erroneous assessments due to disturbances in road surface conditions, etc.

As described above, the second embodiment has the following effect in addition to the effects of the first embodiment. (1) When the actual rotational speed difference ΔN between the average rotational speed of the left and right front wheels 6, 7 and the average rotational speed of the left and right rear wheels 19, 20 has been determined to be smaller than the predetermined rotational speed difference ΔNo, the distribution of drive force to the left and right rear wheels 19, 20 is not immediately reduced by a second predetermined amount ΔT2 corresponding to the deviation between the actual rotational speed difference ΔN and the predetermined rotational speed difference ΔNo, but the present drive force distribution is maintained for the predetermined time t0, and after the predetermined time t0 has elapsed, the determination is again made as to whether or not the actual rotational speed difference ΔN between the average rotational speed of the left and right front wheels 6, 7 and the average rotational speed of the left and right rear wheels 19, 20 is smaller than the predetermined rotational speed difference ΔNo. Therefore, it is possible to minimize erroneous assessments due to disturbances in road surface conditions, etc.

Third Embodiment

Figure 6:
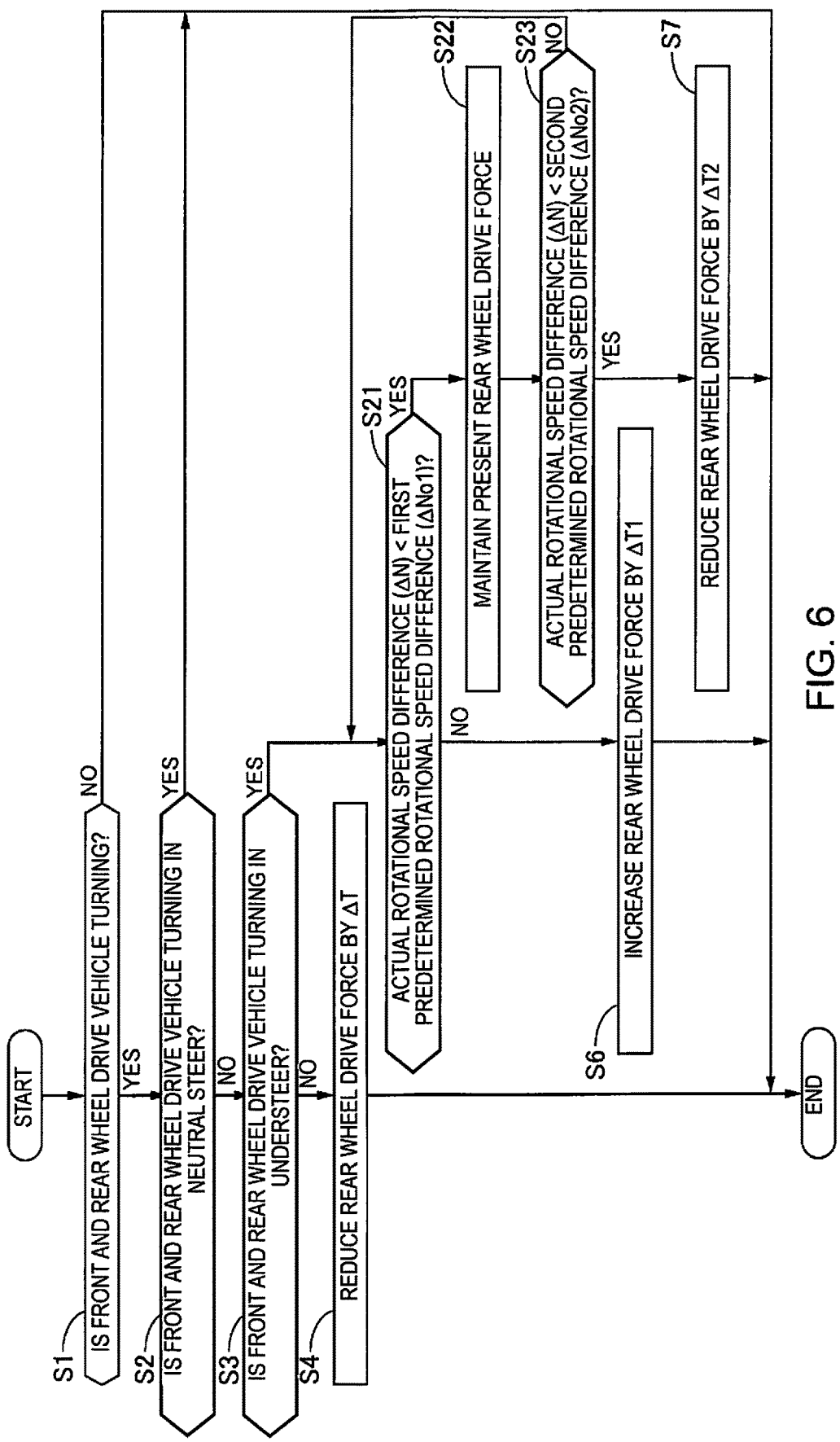
FIG. 6 is a flowchart of a flow of a control process in a control unit C/U of a third embodiment.

FIG. 6 is a flowchart of a flow of a control process in a control unit C/U of the third embodiment. This flowchart is repeatedly executed in a predetermined computation cycle.

The basic configuration of the third embodiment is the same as that of the first embodiment, and therefore only sections different from the first embodiment are described. Specifically, the predetermined rotational speed difference ΔNo is set as a first predetermined rotational speed difference ΔNo1 and a second predetermined rotational speed difference ΔNo2 smaller than the first predetermined rotational speed difference ΔNo1.

In step S21, a determination is made as to whether or not the actual rotational speed difference ΔN between the average rotational speed of the left and right front wheels 6, 7 and the average rotational speed of the left and right rear wheels 19, 20 is smaller than the first predetermined rotational speed difference ΔNo1. When the actual rotational speed difference ΔN between the average rotational speed of the left and right front wheels 6, 7 and the average rotational speed of the left and right rear wheels 19, 20 is not smaller than the first predetermined rotational speed difference ΔNo1, the process advances to step S6, and when the actual rotational speed difference ΔN between the average rotational speed of the left and right front wheels 6, 7 and the average rotational speed of the left and right rear wheels 19, 20 is smaller than the first predetermined rotational speed difference ΔNo1, the process advances to step S22. In step S22, the rear wheel drive force imparted by the present drive force distribution is maintained. In step S23, a determination is made as to whether or not the actual rotational speed difference ΔN between the average rotational speed of the left and right front wheels 6, 7 and the average rotational speed of the left and right rear wheels 19, 20 is smaller than the second predetermined rotational speed difference ΔNo2. When the actual rotational speed difference ΔN between the average rotational speed of the left and right front wheels 6, 7 and the average rotational speed of the left and right rear wheels 19, 20 is not smaller than the second predetermined rotational speed difference ΔNo2, the process returns to step S21, and when the actual rotational speed difference ΔN between the average rotational speed of the left and right front wheels 6, 7 and the average rotational speed of the left and right rear wheels 19, 20 is smaller than the second predetermined rotational speed difference ΔNo2, the process advances to step S7. Specifically, when the actual rotational speed difference ΔN between the average rotational speed of the left and right front wheels 6, 7 and the average rotational speed of the left and right rear wheels 19, 20 has been determined to be smaller than the first predetermined rotational speed difference ΔNo1, the distribution of drive force to the left and right rear wheels 19, 20 is not immediately reduced by a second predetermined amount ΔT2 corresponding to the deviation between the actual rotational speed difference ΔN and the predetermined rotational speed difference ΔNo1, but a determination is made as to whether or not the actual rotational speed difference ΔN between the average rotational speed of the left and right front wheels 6, 7 and the average rotational speed of the left and right rear wheels 19, 20 is smaller than the second predetermined rotational speed difference ΔNo2. It is thereby possible to minimize erroneous assessments due to disturbances in road surface conditions, etc.

As described above, the third embodiment has effects similar to those of the second embodiment.

Other Embodiments

Modes for carrying out the present invention were described above based on the embodiments, but these embodiments are not provided by way of limitation on the specific configuration of the present invention; the present invention even includes design changes, etc., that do not deviate from the scope of the invention. For example, the drive force source was described as an engine in the embodiments, but the drive force source may be an electric motor. Moreover, the main drive wheels were described as the left and right front wheels and the auxiliary drive wheels were described as the left and right rear wheels in the embodiments, but the main drive wheels may be the left and right rear wheels and the auxiliary drive wheels may be the left and right front wheels.

The invention claimed is:

1. A drive force distribution method for a front and rear wheel drive vehicle provided with a drive force distribution device that controls a distribution of a drive force generated by a drive force source to main drive wheels and auxiliary drive wheels, the drive force distribution control method comprising:

determining whether a turning travel of the vehicle;

determining whether understeer of the vehicle when the turning travel of the vehicle is determined;

determining whether or not a rotational speed difference between a rotational speed of the main drive wheels and a rotational speed of the auxiliary drive wheels is smaller than a predetermined rotational speed difference upon determining the understeer of the vehicle;

increasing a present distribution of the drive force to an auxiliary drive wheel side in the drive force distribution device by a first predetermined amount upon determining the rotational speed difference between the rotational speed of the main drive wheels and the rotational speed of the auxiliary drive wheels has been determined to not be smaller than the predetermined rotational speed difference; and reducing the present distribution of the drive force to the auxiliary drive wheel side in the drive force distribution device by a second predetermined amount upon determining the rotational speed difference between the rotational speed of the main drive wheels and the rotational speed of the auxiliary drive wheels has been determined to be smaller than the predetermined rotational speed difference.

2. The drive force distribution method according to claim 1, further comprising maintaining the present distribution of the drive force to the auxiliary drive wheel side in the drive force distribution device upon determining the rotational speed difference between the rotational speed of the main drive wheels and the rotational speed of the auxiliary drive wheels has been determined to be smaller than the predetermined rotational speed difference, and then reducing the present distribution of the drive force to the auxiliary drive wheel side by the second predetermined amount upon determining the rotational speed difference between the rotational speed of the main drive wheels and the rotational speed of the auxiliary drive wheels has been determined to be smaller than the predetermined rotational speed difference after a predetermined time has elapsed.

3. The drive force distribution method according to claim 2, wherein
the predetermined rotational speed difference is set based on at least one of a vehicle speed and a yaw rate.

4. The drive force distribution method according to claim 3, wherein
the predetermined rotational speed difference is set commensurately greater as at least one of the vehicle speed and the yaw rate is higher.

5. The drive force distribution method according to claim 2, wherein
the main drive wheels are front wheels and the auxiliary drive wheels are rear wheels.

6. The drive force distribution method according to claim 1, further comprising
the predetermined rotational speed difference is a first predetermined rotational speed difference and a second predetermined rotational speed difference smaller than the first predetermined rotational speed difference,
maintaining the present distribution of the drive force to the auxiliary drive wheel side in the drive force distribution device upon determining the rotational speed difference between the rotational speed of the main drive wheels and the rotational speed of the auxiliary drive wheels has been determined to be smaller than the first predetermined rotational speed difference, and then reducing the present distribution of the drive force to the auxiliary drive wheel side in the drive force distribution device by the second predetermined amount upon determining the rotational speed difference between the rotational speed of the main drive wheels and the rotational speed of the auxiliary drive wheels has been determined to be smaller than the second predetermined rotational speed difference.

7. The drive force distribution method according to claim 6, wherein
the predetermined rotational speed difference is set based on at least one of a vehicle speed and a yaw rate.

8. The drive force distribution method according to claim 7, wherein
the predetermined rotational speed difference is set commensurately greater as at least one of the vehicle speed and the yaw rate is higher.

9. The drive force distribution method according to claim 6, wherein
the main drive wheels are front wheels and the auxiliary drive wheels are rear wheels.

10. The drive force distribution method according to claim 1, wherein
the predetermined rotational speed difference is set based on at least one of a vehicle speed and a yaw rate.

11. The drive force distribution method according to claim 10, wherein
the predetermined rotational speed difference is set commensurately greater as at least one of the vehicle speed and the yaw rate is higher.

12. The drive force distribution method according to claim 1, wherein
the main drive wheels are front wheels and the auxiliary drive wheels are rear wheels.

13. A drive force distribution control device for a front and rear wheel drive vehicle provided with a drive force distribution device that controls a distribution of a drive force generated by a drive force source to main drive wheels and auxiliary drive wheels, the drive force distribution control device comprising:
a turning determination unit configured to determines a turning travel of the vehicle;
a steer determination unit configured to determines an understeer of the vehicle when the turning travel of the vehicle is determined by the turning determination unit;
a rotational speed difference determination unit configured to determines whether or not a rotational speed difference between a rotational speed of the main drive wheels and a rotational speed of the auxiliary drive wheels is smaller than a predetermined rotational speed difference when the understeer of the vehicle has been determined by the steer determination unit; and
a drive force distribution control part configured to increase a present distribution of the drive force to an auxiliary drive wheel side in the drive force distribution device by a first predetermined amount upon determining the rotational speed difference between the rotational speed of the main drive wheels and the rotational speed of the auxiliary drive wheels has been determined by the rotational speed difference determination unit to not be smaller than the predetermined rotational speed difference, and
the drive force distribution control part being configured to reduce the present distribution of the drive force to the auxiliary drive wheel side in the drive force distribution device by a second predetermined amount when the rotational speed difference between the rotational speed of the main drive wheels and the rotational speed of the auxiliary drive wheels has been determined by the rotational speed difference determination unit to be smaller than the predetermined rotational speed difference.

* * * * *